United States Patent
Fai

[19]

[11] Patent Number: 6,144,160
[45] Date of Patent: Nov. 7, 2000

[54] LAMP WITH A TEMPERATURE-CONTROLLED AUTOMATICALLY PROTECTING CIRCUIT

[75] Inventor: Chan K. Fai, Kowloon Bay, The Hong Kong Special Administrative Region of the People's Republic of China

[73] Assignee: Catalina Lighting, Inc., Miami, Fla.

[21] Appl. No.: 09/152,479

[22] Filed: Sep. 14, 1998

Related U.S. Application Data

[63] Continuation-in-part of application No. 08/946,164, Oct. 7, 1997.

[51] Int. Cl.[7] ........................................... H01J 7/24
[52] U.S. Cl. ........................ 315/118; 315/119; 315/149; 315/307; 361/20; 361/37; 361/71
[58] Field of Search ..................... 315/118, 119, 315/149, 158, 307, DIG. 4; 362/248, 410, 418; 250/214 AL, 214 R; 361/20, 24, 37, 76, 71

[56] References Cited

U.S. PATENT DOCUMENTS

| | | | |
|---|---|---|---|
| 4,449,074 | 5/1984 | Luchaco | 315/159 |
| 4,694,223 | 9/1987 | Campolo | 315/118 |
| 5,800,052 | 9/1998 | Yeh | 362/376 |
| 5,801,490 | 9/1998 | Fai | 315/118 |
| 5,863,111 | 1/1999 | Turner et al. | 362/410 |

*Primary Examiner*—Haissa Philogene
*Attorney, Agent, or Firm*—Joseph J. Zito; Kendal M. Sheets

[57] ABSTRACT

A lamp with a temperature-controlled automatically protecting circuit which includes a temperature induction circuit and a sampling circuit with its input end to connect with an output end of the temperature induction circuit, wherein the temperature control automatically protecting circuit further includes: a comparing circuit which has an input end to connect with an output end of the sampling circuit and when a positive voltage drop across the sampling resistance of the sampling circuit is lower than a reference voltage, the comparing circuit will have a high electrical level output; a trigger circuit which has an input end to connect with an output end of the comparing circuit and a thyristor which can be triggered by the high electrical level output of the comparing circuit to have the trigger circuit in the on state; and a maintaining circuit which has a capacitance in parallel with the thyristor in the trigger circuit and which, after being in series with a resistance, have a low electric level output to the protected operational circuit.

10 Claims, 6 Drawing Sheets

LAMP WITH A TEMPERATURE-CONTROLLED AUTOMATICALLY PROTECTING CIRCUIT

CROSS REFERENCE TO RELATED APPLICATIONS

This application is a continuation-in-part of currently pending application Ser. No. 08/946,164 filed Oct. 7, 1997.

FIELD OF THE INVENTION

The present invention relates to a lamp with a temperature-controlled automatically protecting circuit, and particularly to the lamp with a temperature control protection circuit adapted for a high-powered light emitter.

BACKGROUND OF THE INVENTION

Chinese Invention Patent Application No.96120428.1 (corresponding to U.S. Application Serial No. 60/027,914) discloses a Fire-safe Halogen Torchiere Lamp with a grid in which a fuse or thermo-sensentive switch is functioned as a thermo-sentitive element. As shown in FIG. 1, a sensor 1 provided with such a sensing element is attacheded on a reflector 3. When a cover such as cheesecloth (in UL tests) or a white duck (in CSA tests) is put on a grid 2 at the lamp head and the tempeture is too high, the lamp switches off automatically to avoid any danger of fire. The lamp will switch on then automatically after the temperature is lowered. The cycle of lighting off to lighting up will continues and is apt to damage the life of the lamp and the cover before an additional manual operation stops the cycle.

FIG. 2 shows a halogen torchiere lamp, which is added a temperature control automatically protecting circuit having a locking function to overcome the above mentioned disadvanatge. As shown in the figure, when the temperature of the lamp $L_1$ increases to a certain extent, the voltage of a sampling resistance $R_1$ in series with a sensing element $D_1$ increases, triggering the base of a transistor $Q_2$ and causing transistor $Q_2$ to be in the on state. The emitter of the transistor $Q_1$. connects with the base of the transistor $Q_2$, and the on state of transistor $Q_2$ brings the transistor $Q_1$ also in an on state. The "on-states" of both transistors $Q_1$ and $Q_2$ in turn result in an avalanche cycle to cause the transistor $Q_2$ to be into a deeply saturated on-state. Thus a very low potential difference will be generated between points A and B. A diode $D_2$ is provided between points A and C. The potential at the point C connecting with the anode of diode $D_2$ is higher than that at the point A only by 0.7 volt. Therefore, Potential applied to the base of thyristor $D_{10}$ at the point D from the point C through both the adjustable resistance $R_{10}$ and the resistance $R_{11}$ is so low as to be unable in making the thyristor $D_{10}$ on. Therefore, it is impossible to trigger a thyristor $TH_1$ by the thyristor $D_{10}$ connecting with the control grid of the thyristor $TH_1$. Hence, the lamp $L_1$ in the operational circuit is locked and is not permitted to switch on again.

However, though the above mentioned protection circuit has the locking function, yet its construction is of the type "once for all". Meanwhile, it has many deficiencies in practice and the protection provided thereby is not reliable. FIG. 3 is a detailed view showing the lamp with the protection circuit shown in FIG. 2. In FIG. 3, the sensor 1 with the sensing element $D_1$ is attached directly on the reflector 3 of the lamp head. The two points F and G in FIG. 2 can be the welding points formed at the leads of the sensing element $D_1$ on a printed circuit board (PCB) 6. The two leads have a length about 1000 mm respectively and pass through a main vertical iron tube to the PCB 6. The main vertical tube has three sections, which are connected by threads. In addition, the connection between the vertical main tube and the base of the lamp as well as the connection between the vertical tube and the lamp head are all achieved through threads, which means a plurality of rotations being necessary during mounting of the lamp. The rotations during mounting will twist and are apt to break the wire between point F and the sensing element $D_1$ as well as the wire between the point G and the sensing element $D_1$. When any of the two wires is broken, the sensing element $D_1$ will be disconnected with the circuits of the PCB 6. Thus, regardless of how high a temperature that the sensing element $D_1$ has sensed, the operation circuit does not work, because the transistors $Q_1$ and $Q_2$ in FIG. 2 will not shift to be the on state and the high potential difference is kept between points C, D, which holds the thyristor $D_{10}$ to be the on state and in turn holds the thyristor $TH_1$ also to be the on state in such a manner that the lamp $L_1$ will be lighted up and will be never extinguished. Therefore, the automatic extinguishment cannot be realized. Moreover, the most serious hidden trouble in such a construction is that the breaking of wires of the sensing element $D_1$ or a short pass in the element $D_1$ itself can not be discovered from outside. Therefore, the probability of fire is very great.

In practice, since sensors directly stands on the reflector near the halogen bulb, when a bulb is replaced, sensors will be often touched without intention and the connection between the sensor and electronic circuit may be damaged. The damaged connection will prevent a sensing signal from transmitting to the electronic circuit. Additionally, the members installed on the reflector will mar the reflection.

SUMMARY OF THE INVENTION

In view of the deficiencies of the circuit construction of the prior art, it is thus a main object of the present invention to provide a lamp with a temperature-controlled automatically protecting circuit wherein the protection circuit includes a maintaining circuit which can respond to not only temperature rise but also the troubles occurred in the circuit, so that the lamp can always be kept always in a protected state.

It is another object of the present invention to provide an improved construction for lamp grid which covers the sensing elements of the protection circuit and are adapted both for the mounting of the protection circuit and for the improvement of reliability of the protection circuit.

In order to realize the objects, the present invention provides a lamp with a temperature-controlled automatically protecting circuit which includes a temperature sensing circuit and a sampling circuit with its input end to connect with an output end of the temperature sensing circuit, wherein the temperature control automatically protecting circuit further comprises:

a comparing circuit which has an input end to connect with an output end of the sampling circuit and when a positive voltage drop across the sampling resistance of the sampling circuit is lower than a reference voltage, the comparing circuit will have a high electrical level output;

a trigger circuit which has an input end to connect with an output end of the comparing circuit and a thyristor which can be triggered by the high electrical level output of the comparing circuit to have the trigger circuit in the on state; and a maintaining circuit which has a capacitance in parallel with the thyristor in the trigger circuit and which, after being in series with a resistance, have a low electric level output to the protected operational circuit.

BRIEF DESCRIPTION OF THE DRAWINGS

The present invention will become more clearly appreciated as the disclosure of the present invention is made with reference to the accompanying drawings wherein.

DETAILED DESCRIPTION OF THE PREFERRED EMBODIMENT

Figure 1:
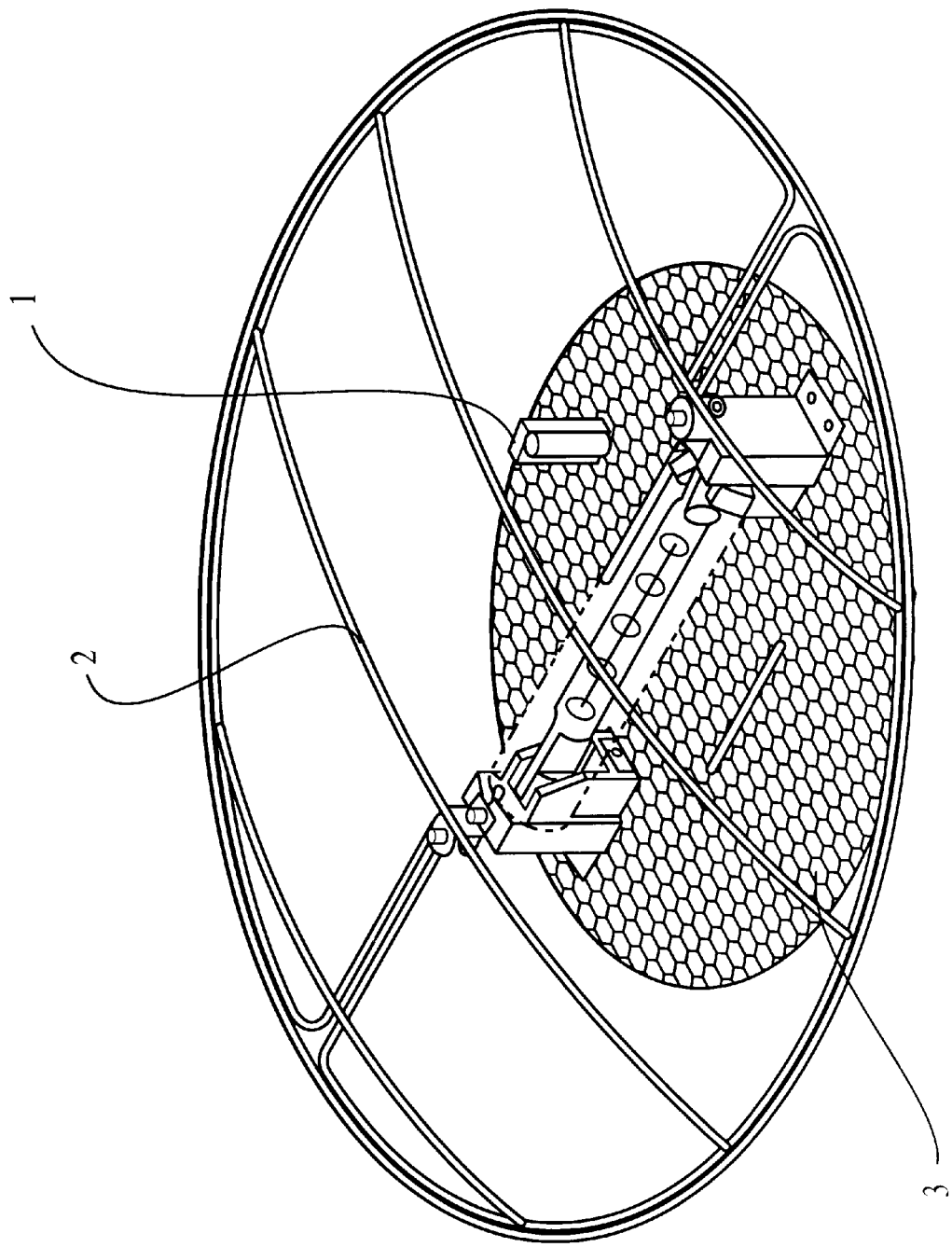
FIG. 1 is a view schematically showing a temperature sensing element made of a fuse in a temperature control automatically protecting circuit used for a lamp in the prior art.
Figure 2:
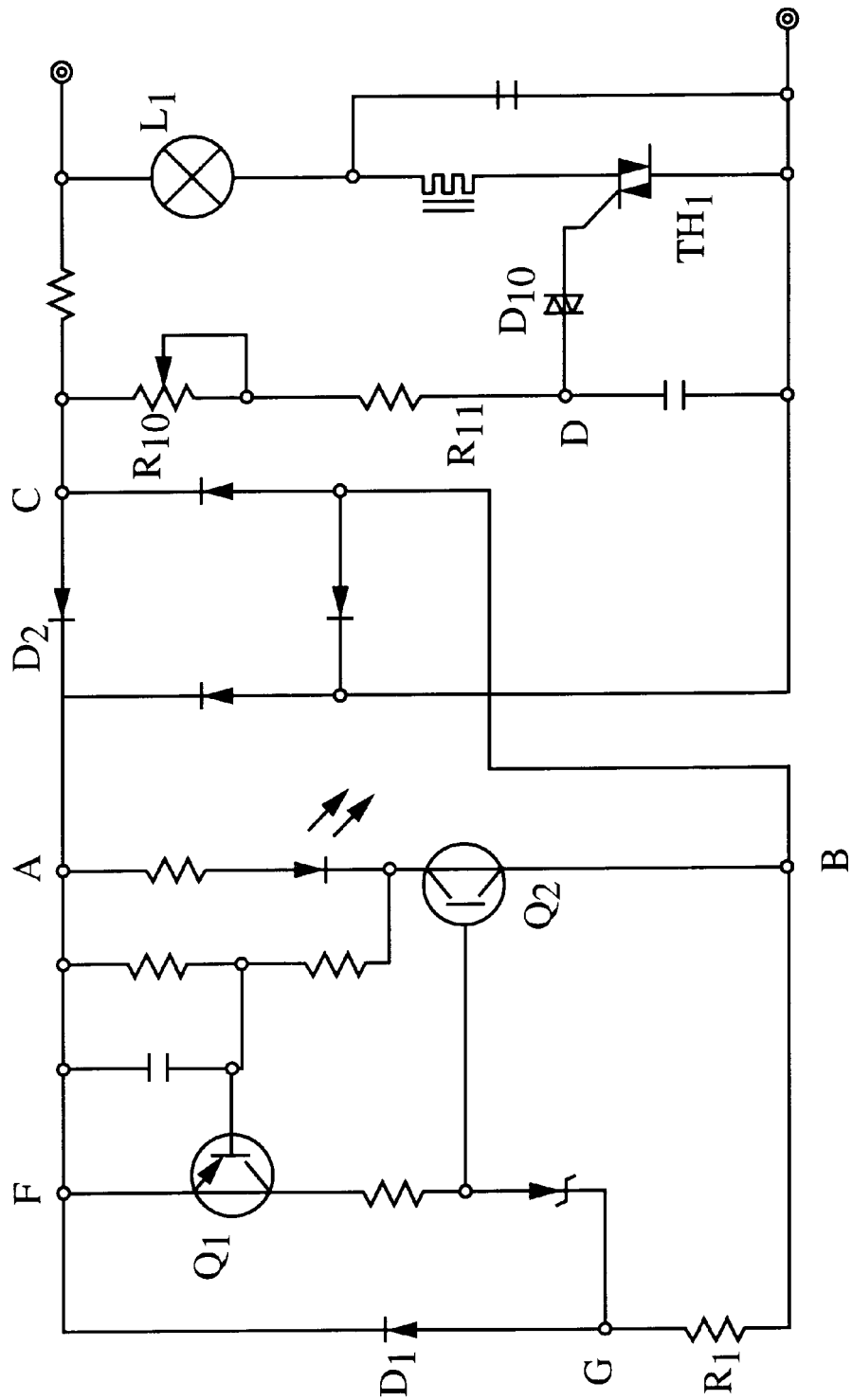
FIG. 2 shows a diagram of a similar protection circuit of the prior art, but the circuit has a locking function.
Figure 3:
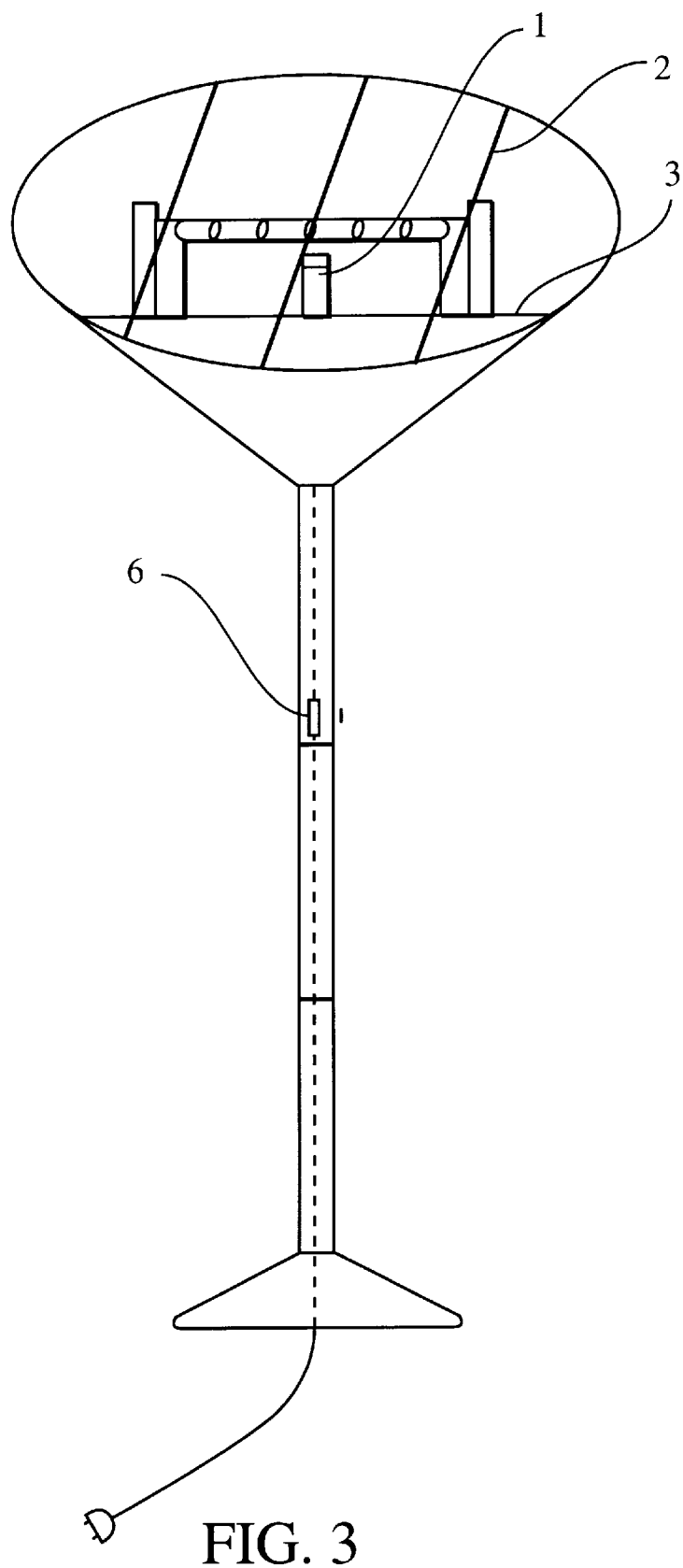
FIG. 3 is a view schematically showing an arrangement of the lamp with the protection circuit shown as in FIG. 2.
Figure 4:
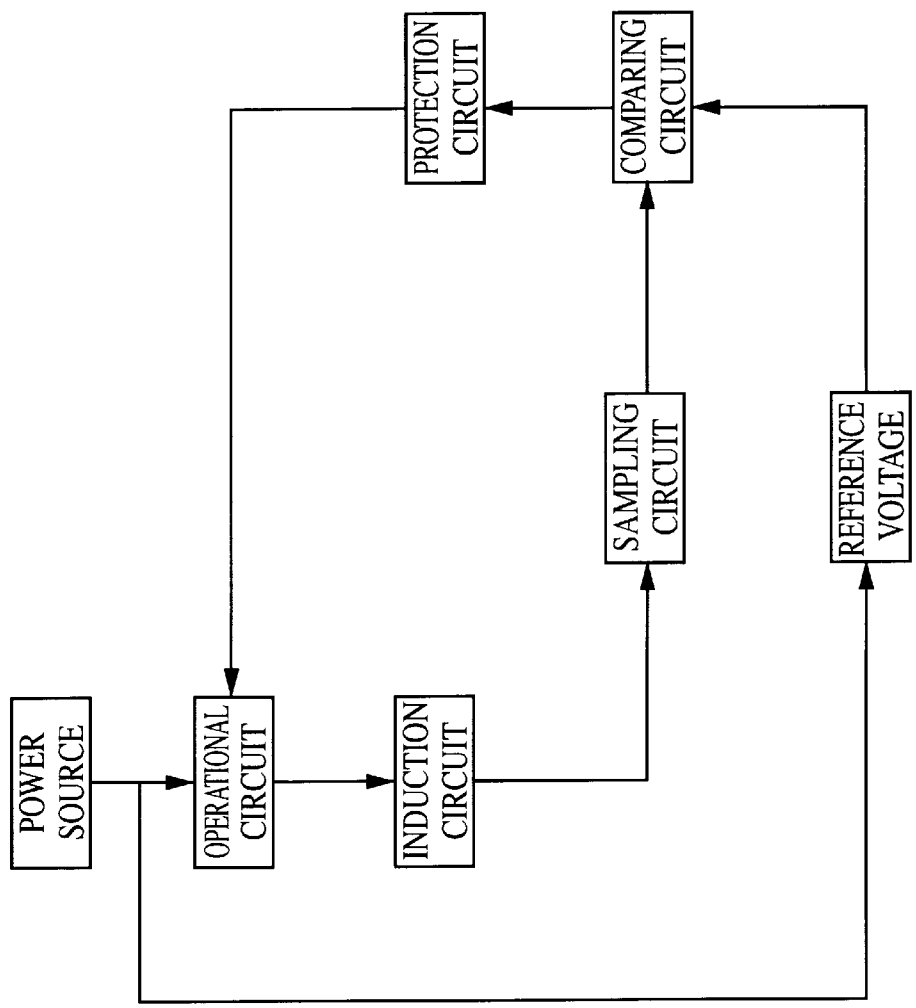
FIG. 4 is a block diagram of the automatically protecting circuit according to the invention.
Figure 5:
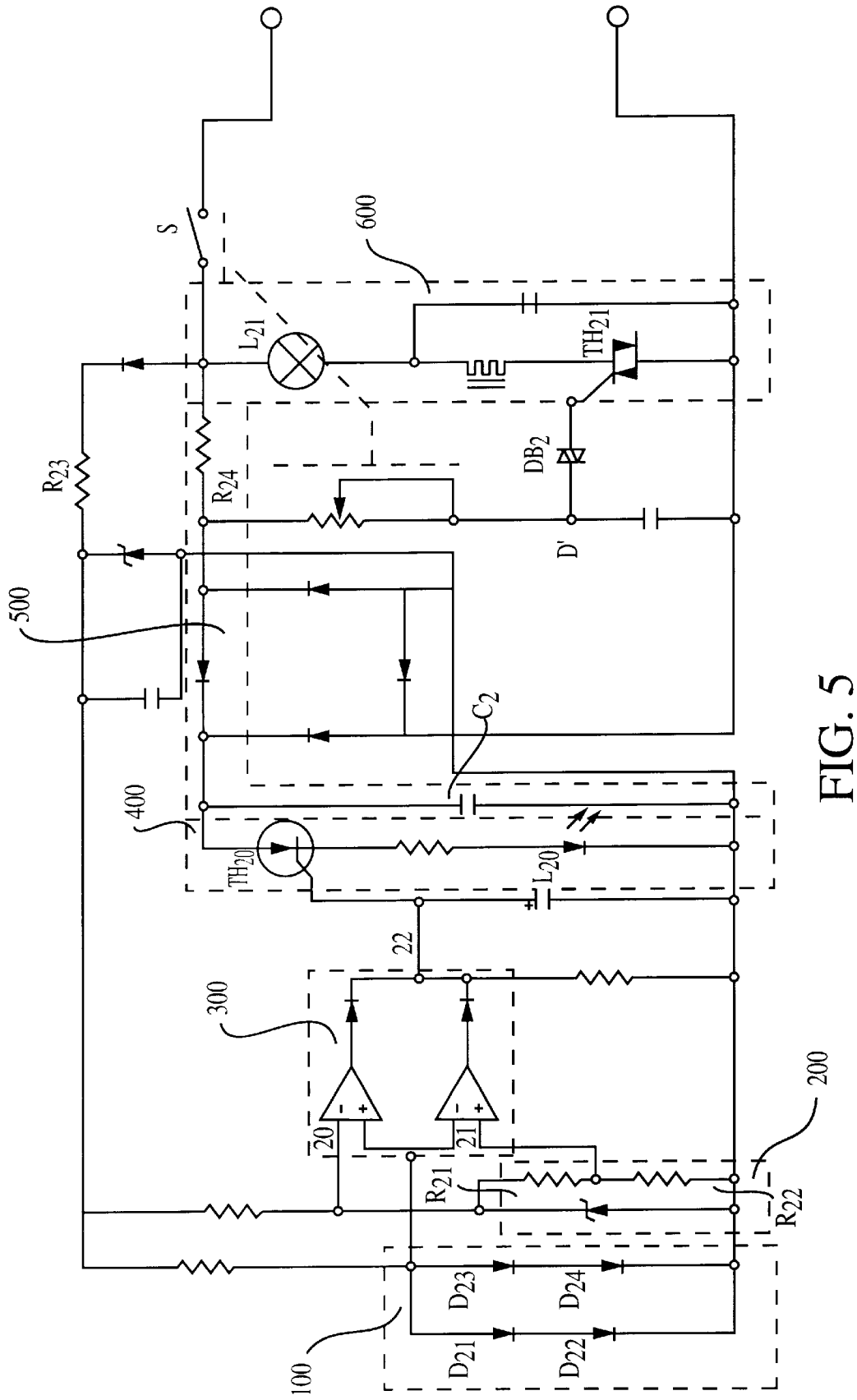
FIG. 5 is a circuit diagram of a preferred embodiment according to the invention.

FIG. 5 shows an automatically protecting circuit diagram according to a preferred embodiment of the present invention. An induction circuit 100 of the automatically protecting circuit is a rectifier bridge circuit constructed from four (or more, or less than four) diodes of IN4007 (the other model may be also used), designated as $D_{21}$, $D_{22}$, $D_{23}$ and $D_{24}$. The rectifier bridge has an anode end connected with a power source through a reference resistance $R_{23}$ and has a cathode end connected with two resistances $R_{21}$ and $R_{22}$ in series in a sampling circuit 200. A comparing circuit 300 uses an integrated circuit chip IM2904. The voltage drop of the reference resistance $R_{23}$ and the voltage drop adopted from the sampling resistance $R_{22}$ connect with legs 20 and 21 of the comparing circuit chip 300 respectively. The output end 22 of the comparing circuit 300 connects with a base of a control element $TH_{20}$ of a trigger circuit 400. The control element TH20 can be a low-powered thyristor CR02AM8A4N. An alarm light emitting diode $L_{20}$ is connected in series with the control element $TH_{20}$ to indicate an alarm state. A capacitance $C_2$ is in parallel with the ends of the control element $TH_{20}$ and the alarm diode $L_{20}$, and is also in series with a rectifier bridge and a resistance $R_{24}$. The capacitance $C_2$ and a resistance $R_{24}$ connected in series form a maintaining circuit 500. An operational circuit 600 controlled by the temperature control automatically protecting circuit is consisted of a high-powered light emitter $L_{21}$ and a control element $TH_{21}$. The control element is a high-powered three-terminal bidirectional thyristor unit Q4010L4 and the operational circuit 600 connects with the power source through a switch S. A low-powered thyristor $DB_2$ connects with the base of the control element $TH_{21}$ and the base of the low-powered thyristor $DB_2$ in turn connects with the output end of the hold circuit 500 through the rectifier bridge.

According to the invention, when the temperature of the light emitter increases above 200° C., temperature sensing elements $D_{21}$, $D_{22}$, $D_{23}$ and $D_{24}$ enclosed in metal tubes 4 over the light emitter will response to the temperature rise and the positive voltage drops of these diodes decrease fast. Then, the decreased voltage drops of the diodes sampled by the sampling circuit 200 will be compared with the voltage drop on the reference resistance $R_{23}$ by a comparator LM2904, as shown in FIG. 5. When the voltage drop sampled by the sampling circuit 200 is lower than the reference voltage, i.e., when a certain temperature very close to the temperature by which the cheese-cloth will be burnt, the comparator LM2904 has a high level output about 15V applied to the low-powered thyristor $TH_{20}$ to make the later in the on state. It shall be appreciated that, once the thyristor $TH_{20}$ is in the on state, even if the high level output of the comparator LM2904 is removed, the maintaining circuit 500 comprised of the resistance $R_{24}$ and the capacitance $C_2$ will still hold the thyristor $TH_{20}$ in the on state and therefore it is possible to decrease the potential at the point D' or the low-powered thyristor $DB_2$ which connects with the output end of the maintaining circuit 500, so that the potential of the control grid in the high-powered thyristor $TH_{21}$ used to feed for the light emitter is decreased to a potential lower than the triggering voltage and that the thyristor $TH_{21}$ is off. Then the circuit is in a protected state in such a manner that the lighter emitter $L_{21}$ is extinguished regardless of how low the temperature of the induction portion (the lamp grid portion) may be. Even if the temperature is decreased to be lower than the normal temperature, the maintaining circuit 500 according to the invention can hold the control element $TH_{20}$ in the on state automatically, whereby the lamp cannot be lighted up unless the switch S is operated manually.

The condition that the wires connected between the sampling resistance $R_{22}$ and the temperature sensing elements $D_{21}$, $D_{22}$, $D_{23}$ and $D_{24}$ are broken, the wires connected between the elements $D_{21}$, $D_{22}$, $D_{23}$, $D_{24}$ and the ground are broken, or the wires connected between elements $D_{21}$, $D_{22}$, $D_{23}$ and $D_{24}$ one another is short-circuit, will causes the comparing circuit 300 to have a high level output in such a manner that the trigger circuit 400 and the maintainance circuit 500 are driven and the alarm diode $L_{20}$ flashes. The light emitter $L_{21}$ to be protected does not come to light normally until the induction circuit returns to be in the workable state after repair.

The temperature control automatically protecting circuit according to the present invention has an outstanding advantage of a fast-response protection. When the lamp head is covered with the cheesecloth, the protection circuit will be activated within less than 3 minutes to light off the lamp and lock the lamp in the protected state permanently. Moreover, the protecting circuit works very reliably. Once there occur troubles in the protection circuit itself such as the broken wires or short-circuit, the comparing circuit 300 of the protection circuit will have a high level output to activate the trigger circuit 400 as well as the maintaining circuit 500 and to light up the alarm diode $L_{20}$ which causes the light emitter $L_{21}$ of the operational circuit 600 under the protected state permanently. The lamp does not come to light until the troubles being located and removed.

Figure 6:
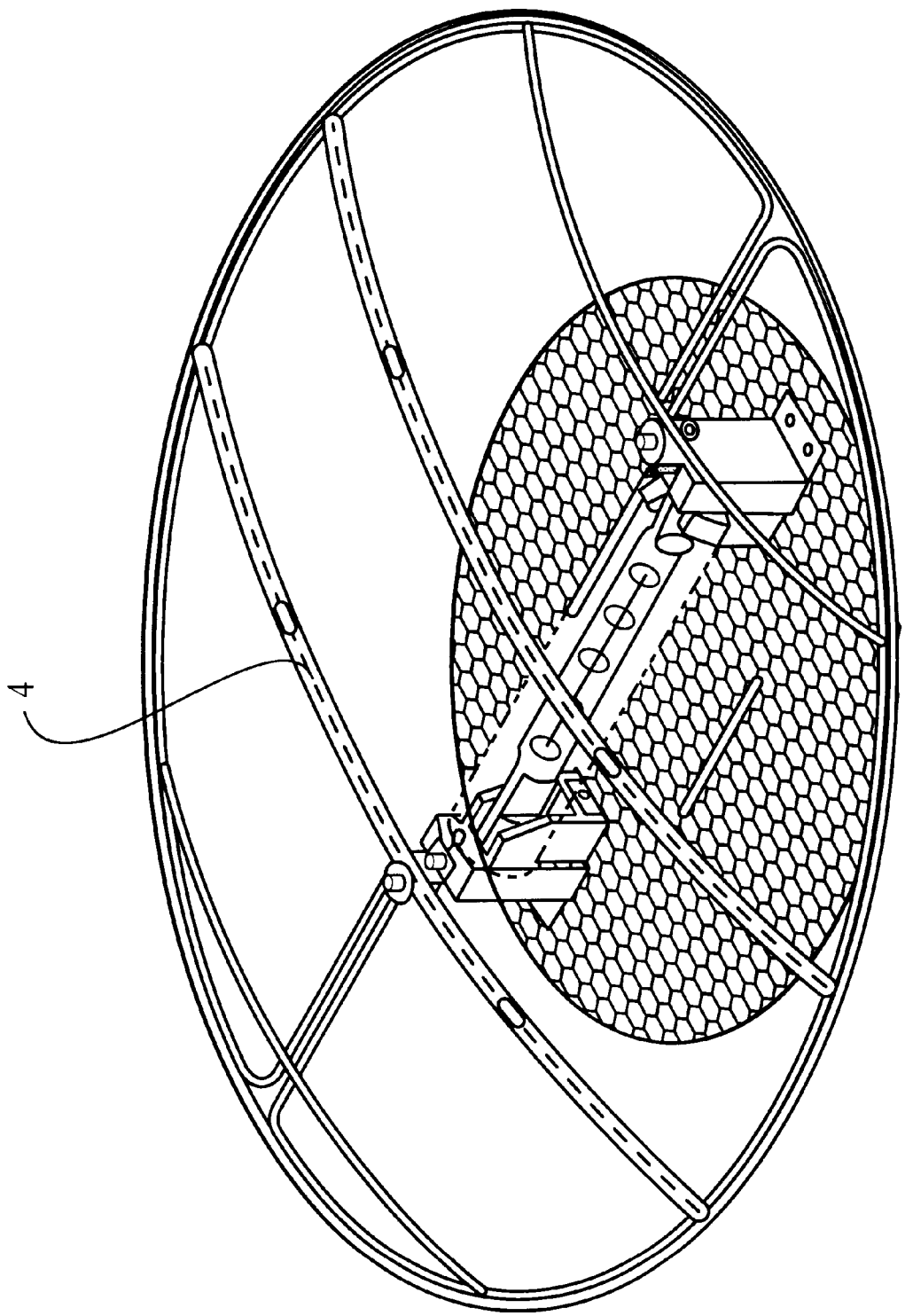
FIG. 6 is a view schematically showing the lamp grid to be used with the temperature control automatically protecting circuit according to the present invention.

FIG. 6 shows an improved lamp grid to work with the temperature control automatically protecting circuit according to the present invention. As comparing with the grid 2 of the prior art, several metal tubes 4 are used to replace the solid rods. The temperature sensing elements of the protection circuit are enclosed in the tube 4. Such arrangement decreases light radiation and makes mounting and repair conveniently, with the improvement of the operation reliability of the protection circuit.

The above protection circuit according to the preferred embodiment of the invention is adapted for a 300 W lamp and 120 AC 60 Hz power feed system. Of course, it can be used for temperature control systems with other power feed systems after necessary modification. Although the preferred embodiment according to the invention is applied to a high-powered lighting system, it is possible that its modifications may be adapted for the other power feed systems. Therefore, it is understood that any modifications or changes can be made by those skilled in the art without departing from the spirit and scope of the appended claims of the present invention.

What is claimed is:

1. A lamp with a temperature-controlled automatically protecting circuit for protecting an operational circuit, which includes a temperature sensing circuit and a sampling circuit with its input end to connect with an output end of said temperature induction circuit, wherein the temperature control automatically protecting circuit further includes:

a comparing circuit which has an input end to connect with an output end of said sampling circuit and when a positive voltage drop across the sampling resistance of said sampling circuit is lower than a reference voltage, said comparing circuit will have a high electric level output;

a trigger circuit which has an input end to connect with an output end of the comparing circuit and a thyristor which can be triggered by the high electrical level output of the comparing circuit to have the trigger circuit in the on state; and a maintaining circuit which has a capacitance in parallel with the thyristor in the trigger circuit and which, after being in series with a resistance, has a low electric level output applied to said protected operational circuit.

2. A lamp with a temperature-controlled automatically protecting circuit according to claim 1, wherein said temperature sensing circuit comprises a plurality of sensing elements.

3. A lamp with a temperature-controlled automatically protecting circuit according to claim 1, wherein said sensing elements comprise sensing diodes.

4. A lamp with a temperature-controlled automatically protecting circuit according to claim 1, wherein said maintaining circuit has a capacitance in series to have a low electric level output even if a high electrical level output by said comparing circuit is being taken away.

5. A lamp with a temperature-controlled automatically protecting circuit according to claim 1, wherein said maintaining circuit has a low electrical level output to a control element which is in series connection with a protected operational circuit while said thyristor element of said trigger circuit is being activated.

6. A lamp with a temperature-controlled automatically protecting circuit according to claim 1, wherein said trigger circuit provides an alarm light emitting diode for indicating the state of warning.

7. A lamp with a temperature-controlled automatically protecting circuit according to claim 1, further including a grid at the lamp head with metal tubes for enclosing said sensing elements.

8. A lamp with a temperature-controlled automatically protecting circuit according to claim 2, wherein said sensing elements comprise sensing diodes.

9. A lamp with a temperature-controlled automatically protecting circuit according to claim 4, wherein said maintaining circuit has a low electrical level output to a control element which is in series with a protected operational circuit while said thyristor element of said trigger circuit is being activated.

10. A lamp with a temperature-controlled automatically protecting circuit according to claim 2, wherein said trigger circuit is provided with an alarm light emitting diode for indicating the state of warning.

* * * * *